United States Patent [19]

Stutz

[11] Patent Number: 4,881,821
[45] Date of Patent: Nov. 21, 1989

[54] APPARATUS FOR MIXING AND DOSING SYNTHETIC RESIN COMPONENTS AND PROCESS FOR THE OPERATION OF THIS APPARATUS

[75] Inventor: Jean Stutz, Tübach, Switzerland

[73] Assignee: Spritztechnik, AG., Tübach, Switzerland

[21] Appl. No.: 111,371

[22] Filed: Oct. 21, 1987

[30] Foreign Application Priority Data

Oct. 24, 1986 [CH] Switzerland ............... 4 236/86-8

[51] Int. Cl.⁴ .................. B01F 15/02; B01F 15/04; B01F 7/00
[52] U.S. Cl. ..................... 366/162; 222/135; 222/145; 366/138; 366/177; 366/325
[58] Field of Search ........... 366/150, 98, 138, 160, 366/161, 162, 191, 184, 194, 130, 325, 328, 177; 222/135, 145, 148, 391, 570; 422/133, 135, 225; 239/413, 414, 104, 106, 110, 112, 304, 407, 527; 403/360, 361

[56] References Cited

U.S. PATENT DOCUMENTS

| | | | |
|---|---|---|---|
| 2,758,553 | 8/1956 | Moser | 222/145 X |
| 2,802,648 | 8/1957 | Christensen et al. | 366/161 |
| 2,847,196 | 8/1958 | Franklin et al. | 366/161 |
| 2,869,907 | 1/1959 | Deliso | 403/361 X |
| 2,975,004 | 3/1961 | Safianoff | 403/361 X |
| 3,076,225 | 2/1963 | Sherbondy | 222/391 X |
| 3,207,486 | 9/1965 | Rosenthal | 366/138 |
| 3,302,832 | 2/1967 | Hardman et al. | 366/162 X |
| 3,892,389 | 7/1975 | Contastin | 366/138 |
| 3,894,722 | 7/1975 | Jones | 366/161 |
| 3,938,783 | 2/1976 | Porter | 366/325 X |
| 4,046,288 | 9/1977 | Bergman | 222/135 |
| 4,154,368 | 5/1979 | Gusmer et al. | 222/135 |

Primary Examiner—Harvey C. Hornsby
Assistant Examiner—Scott J. Haugland
Attorney, Agent, or Firm—Helfgott & Karas

[57] ABSTRACT

Apparatus for mixing and dosing at least two synthetic resin components to produce a single product includes a mixing head wherein the components are mixed together to form the product which is subsequently discharged. The mixing head includes a casing with an end port. A rotor drive shaft has a drive end extending out of the end port. A hollow mixing chamber which receives the components has a connection port adapted for detachable connection with the end port. A first quick connecting-disconnecting coupler mounted partially at the casing and port and partially at the chamber connection port detachably connects the casing to and disconnects the casing from the chamber. A rotor mechanism includes a mixing rotor disposed in the chamber. A second quick connecting-disconnecting coupler is mounted partially on the drive end of the shaft and partially on the rotor detachably connecting the shaft to and disconnecting the shaft from the rotor. The chamber and the rotor are disconnectable from the casing and drive shaft and can be replaced by a cleaning mixing chamber and a clean mixing rotor.

6 Claims, 2 Drawing Sheets

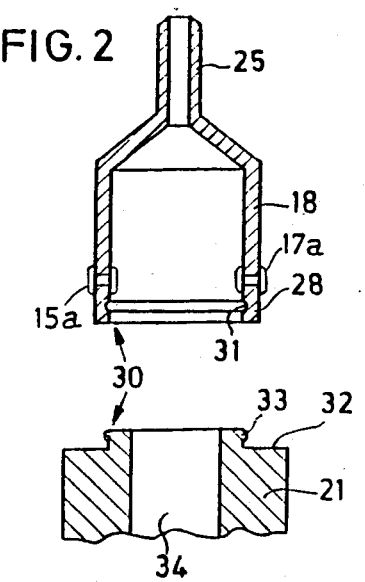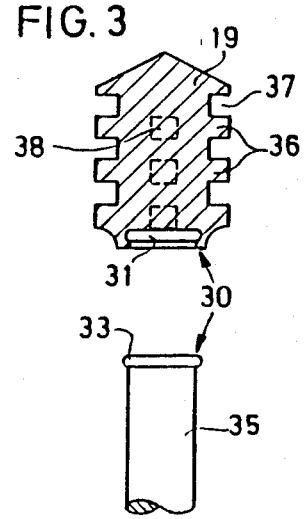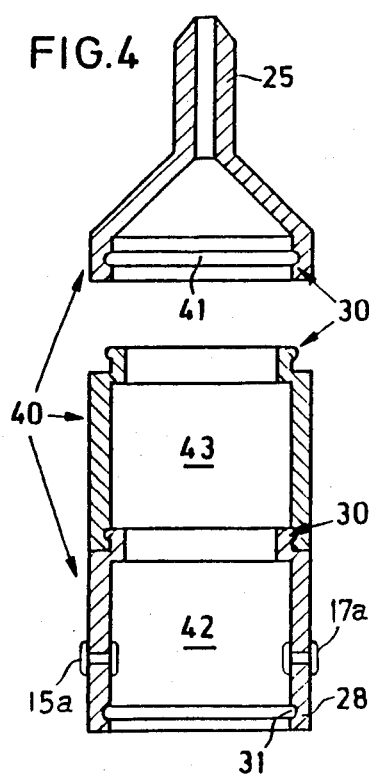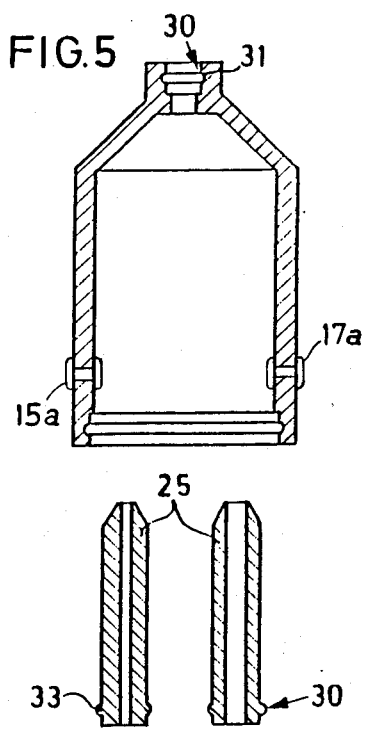

APPARATUS FOR MIXING AND DOSING SYNTHETIC RESIN COMPONENTS AND PROCESS FOR THE OPERATION OF THIS APPARATUS

Background of the Invention

The present invention relates to an apparatus for mixing and/or dosing at least two components of synthetic resins to produce a product suitable for casting, extrusion or foaming. The apparatus includes a mixing head used for brining together, mixing and discharging the components. The invention also relates to a process for operating this apparatus.

Known apparatus for the processing of two or more synthetic resin components all are adapted to use a mixing head wherein components are brought together, and mixing takes place, cf. e.g. EP 0 064 209 Bl. It is desirable for such apparatuses to be usable for a maximum number of purposes. Such purposes include the casting of synthetic resins in connection with the manufacture of equipment parts, the extrusion and coating of synthetic resin lacquers for the protection of steel, wood, concrete, etc., in situ foaming for the most varied types of constructions and bonding and cementing during the manufacture and assembly of components.

Every so often such apparatuses must be cleaned and for this purpose the mixing head is rinsed with a solvent. However, the relatively large amount of solvent required for this purpose is prejudicial to the environment, quite apart form the solvent costs.

Summary of the Invention

An object of the present invention is to develop new and improved apparatus as well as a process for operating the same in such a way that the solvent requirement becomes insignificant, but nevertheless the apparatus can be operated in the same way as when using solvents.

In accordance with the principles of the invention, apparatus for mixing and dosing at least two synthetic resin components to produce a single product utilizes a mixing head wherein the components are received and brought together. These components are mixed together to form the product which is subsequently discharged.

To this end, the head includes a mixing head casing with an end port. A rotor drive shaft has a drive end extending out of the end port. A hollow mixing chamber for receiving said components and having a discharge port from which the product is discharged has a connection port adapted for detachable connection with the end port. First quick connecting-disconnecting means mounted partially at the casing end port and partially at the chamber connection port detachably connects the casing end port to and disconnects the casing end port from the chamber connection port. Rotor means includes a mixing rotor disposed in the chamber and second quick connecting-disconnecting means mounted partially on the drive end of the shaft and partially on the rotor for detachably connecting the shaft to and disconnecting the shaft from the rotor.

In using such apparatus, the cleaning operation is carried out by first stopping the flow of the components to the chamber, injecting a substantially unnoticeable quantity of solvent therein and scavenging the chamber and rotor by blowing compressed air therethrough several times. The chamber and rotor are then quickly disconnected from the casing and rotor drive shaft and a clear product free chamber and rotor are connected to the casing and drive shaft respectively.

The foregoing as well as additional objects and advantages of the invention will either be explained or will become apparent to those skilled in the art when this specification is read in conjunction with the brief description of the drawings and the detailed description of preferred embodiments which follow.

Brief Description of the Drawings

FIG. 2 is a sectional view through the mixing chamber and end port of the mixing head casing, showing these parts separated and illustrating the quick connectingdisconnecting means.

FIG. 3 is a sectional view through the mixing rotor and rotor shaft, showing these parts separated and illustrating the second quick connecting-disconnecting means.

FIG. 4 is a diagrammatically shown section through a mixing chamber subdivided into several chamber portions.

FIG. 5 is a diagrammatically represented section through a mixing chamber with nozzles connectable by suitable coupling means.

Detailed Description of the Preferred Embodiments

Figure 1:
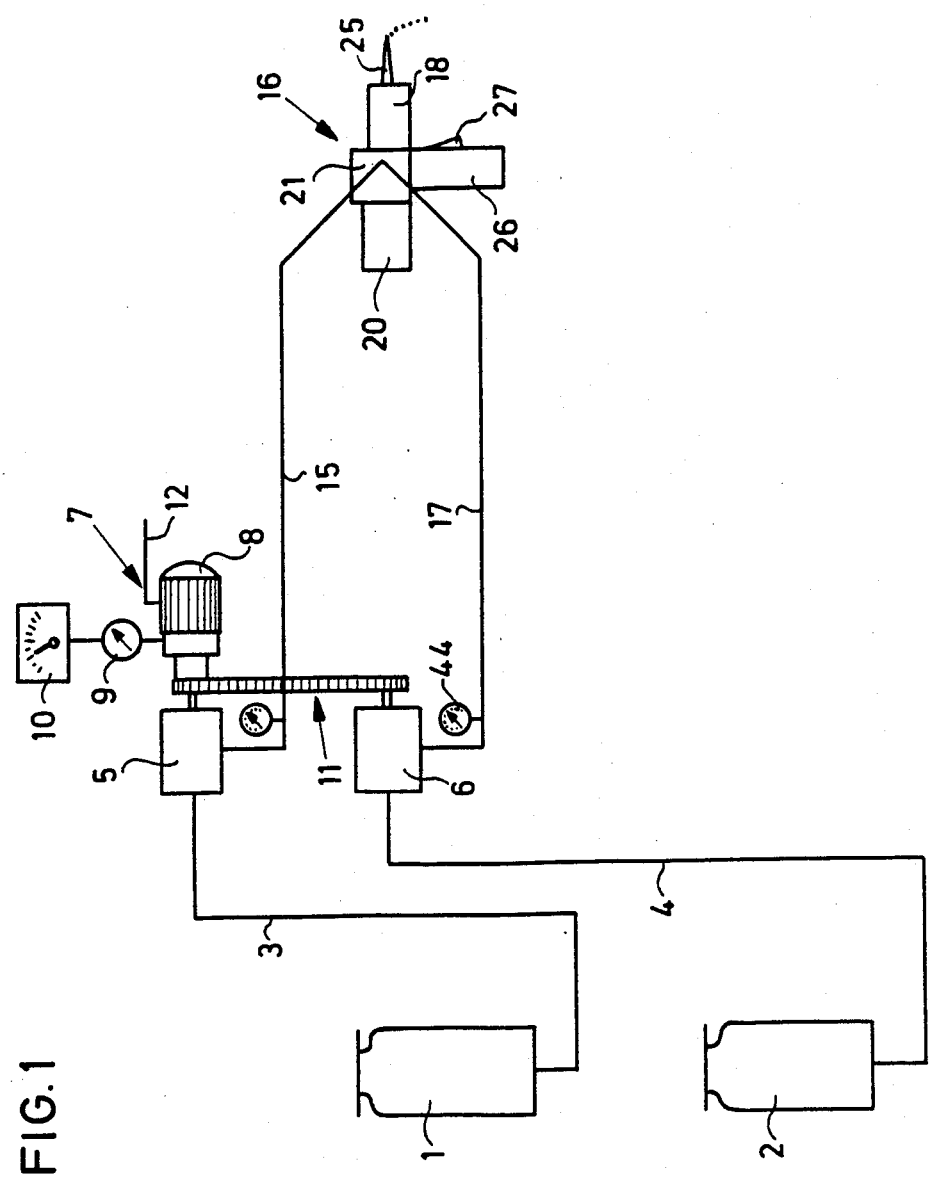
FIG. 1 is a diagram of apparatus in accordance with the invention.

The apparatus for mixing and/or dosing synthetic resin components diagrammatically shown in FIG. 1 has two containers 1, 2 for in each case receiving a different one of two components. If more components are processed, a corresponding number of containers must be provided. Container 1 with one component is connected via a line 3 to a pump 5, and container 2 with the other component is connected via a line 4 to a pump 6. The operation of pumps 5, 6 is controlled by a drive unit 7, which has a motor 8 with measuring instruments 9, 10, an envelope drive 11, e.g. a chain drive, and a power supply 12 for supplying power to motor 8.

Pump 5 by line 15 delivers one component to a mixing head 16, and pump 6 delivers the other component via a line 17 to mixing head 16. Lines 15, 17 terminate in a mixing chamber 18, wherein the two components are mixed by means of a mixing rotor located in mixing chamber 18. The mixing rotor is driven by a driving shaft of motor 20 located on mixing head 16, this shaft extending through a mixing head casing 21 and constitutes the rotor shaft carrying the mixing rotor. Mixing chamber 18 has a nozzle 25, through which the product mixed from the two components is discharged. The mixing head can be carried by means of a handle 26 and operated by an actuating switch 27.

FIG. 2 shows the mixing chamber 18 secured to nozzle 25 at a distance from the mixing head casing 21. A portion of a high-speed or quick connecting-disconnecting means 30 shown at the mixing head-side end 28 of mixing chamber 18, this portion being formed by an inner circumferentially positioned coupling groove 31. The other portion of the means 30 is located on the mixing chamber-side end or end port 33 of the mixing head casing 21 and takes the form of an outer circumferentially arranged coupling ring 33. Coupling groove 31 is the concave part and coupling ring 33 the convex part of means 30. Coupling groove 31 and coupling ring 33 are made from plastic and can consequently be positively assembled as a slip-on coupling, which ensures a reliable coupling of mixing chamber 18 to the mixing head casing 21.

Into bore 34 of mixing head casing 21 projects the rotor shaft 35, which is connected to the mixing rotor 19. Mixing rotor 19 is a cylindrical body, which has a plurality of grooves 37 separated by webs 36. Webs 36 would also be provided with interruptions and consequently broken down into pins 38, which are shown in broken line form in FIG. 3.

Rotor 19 and rotor shaft 35 are also interconnected by a quick connecting-disconnecting means 30, the inner circumferential, concave coupling groove 31 being provided on an end of rotor 19 and the outer circumferential, convex coupling ring 33 on an adjacent end of rotor shaft 35. The gap between the wall of bore 34 and rotor shaft 35 is sealed by a not shown seal, e.g. a slip ring seal.

Coupling groove 31 and coupling ring 33 can also be positioned in interchanged manner on mixing rotor 19 and rotor shaft 34 or on mixing chamber 18 and mixing head casing 21

FIG. 4 shows a mixing chamber variant. Mixing chamber 28 is subdivided into chamber portions 40, the individual portions being interconnected by means 30. Mixing chamber 18 has a head portion 41, a base portion 42 and at least one intermediate portion 43. The coupling groove 31 at the mixing head-side end 28 of the base portion 42 is provided for connection to the coupling ring 33 of mixing head casing 21. In the same way the mixing rotor 19 can be subdivided into several portions, which are interconnected by separate means 30.

FIG. 5 shows that the nozzle 25 can be separated from the mixing chamber 18 or the portion 41 of the latter and can be connected to said mixing chamber 18 or its head portion 41 by means 30. This makes it possible to use nozzles having different diameters as a function of the product to be processed.

The apparatus according to FIG. 1 functions as follows. After the components have been filled into containers 1, 2, the drive unit 7 is started, so that the pumps 5, 6 suck the components through lines 3, 4 and feed them via lines 15, 17, whose pressure is established and monitored by manometers 44. If the product is now to be discharged from nozzle 25, mixing head 16 is put into operation by means of actuating switch 27. Motor 20 rotates the shaft 35 to rotate the mixing rotor 19, while the components are pressed into mixing chamber 18 by the pressure prevailing in lines 15 and 17. Mixing rotor 19 brings about an intense mixing of the components, which pass in homogenized form into nozzle 25 and are discharged therefrom.

During the discharge of the homogenized product, component material is deposited on the opening of lines 15, 17 and product material on nozzle 25. This reduces the efficiency of the apparatus, so that after a certain operating time, the initial state of the mixing head 16 must be restored. This is brought about in that the mixing chamber 18 with nozzle 25 and mixing rotor 19 are removed by detaching the means 30 and are replaced by a clean, productfree mixing chamber 18 and a clean, product-free mixing rotor 19. This replacement takes place extremely rapidly as a result of the means 30 constructed as a slip-on coupling, so that there is only a very brief operational stoppage. If the mixing chamber is subdivided into portions, optionally only parts of the mixing chamber and the mixing rotor need be replaced.

The length of the operating time after which the mixing chamber 18 and mixing rotor 19 must be replaced, can be increase if after a certain operating period mixing chamber 18 and mixing rotor 19 are subject to a scavenging action. In this action, the product located in mixing chamber 18 is expelled therefrom by using compressed air, while mixing rotor 19 rotates at high speed so that the product is hurled against the wall of mixing chamber 18. Before the end of the blowing out process, a small solvent quantity is injected into the mixing chamber 18 in the vicinity of the component inlets. This injection is so small, that it is scarcely noticed and therefore ignored. No noticeable odours occur, even if there is no extraction action. Moreover, no solvent traces with a harmful effect can be detected in the discharged material. Following a number, e.g. ten scavening operations, the replacement of mixing chamber 18 and mixing rotor 19 takes place and this is extremely rapid, i.e. within a few seconds. This is made possible through the use of the means 30. Replacement need not take place manually and instead a robot can be used, which is important in the case of fully automatic operation.

The described means can include other arrangements such as a bayonet coupling or a pipe coupling, i.e. coupling which make it possible to perform the described process.

While the invention has been described with detailed reference to the drawings, it will be obvious to those skilled in the art that many modifications and changes can be made within the scope and sphere of the invention as defined in the claims which follow.

What is claimed is:

1. A mixing head for mixing and dosing at least two synthetic resin components together to produce a single product, said head comprising:

a mixing head casing having an end port;

a rotor drive shaft extending in the casing and having a drive end extending out of the end port;

a hollow mixing chamber for receiving said components, the components being mixed together in the chamber to produce the product, the chamber having a discharge port through which the product is discharged, said chamber having a connection port adapted for detachable connection with the end port;

first quick connecting-disconnecting means mounted partially at the end port of the casing and partially at the connection port of said chamber for detachably connecting the end port of the casing to and disconnecting the end port of the casing from the connection port of the chamber;

rotor means including a mixing rotor disposed in the chamber and having an end facing said drive end of the shaft; and second quick connecting-disconnecting means mounted partially on the drive end of the shaft and partially on the end of the rotor facing said drive end of the shaft for detachably connecting the shaft to and disconnecting the shaft from the rotor, said rotor and said shaft having a common axis, said first means including a first outer circular convex coupling ring provided at one of the end and connection ports and a first inner circular concave groove provided at the other of the end and connection ports, said first ring and first groove being adapted for detachable mating engagement to connect said casing and said chamber to each other in an aligned position thereof, said second means including a second outer circular convex coupling ring at one of said end of the rotor and said drive end of the shaft and a second inner circular concave groove at the other of said end of the rotor and said drive end of the shaft, said second ring and second groove being adapted for detachable mating engagement to connect said shaft and said rotor to each other in an axially aligned position thereof whereby said mixing chamber and said mixing rotor can be replaced by a clean product-free chamber and a clean product-free rotor in the mixing head.

2. The head of claim 1 further including a discharge nozzle detachably connected to the chamber discharge port.

3. The head of claim 2 further including third coupling means for detachably securing the nozzle to the chamber discharge port, the third means being a slip-on coupling provided with a coupling ring and a mating coupling groove.

4. The head of claim 2 wherein the mixing chamber includes at least two chamber sections connected together end to end, each two adjacent sections having abutting ends interconnected by a slip-on coupling provided with a coupling ring and a mating coupling grove.

5. The head of claim 4 wherein the mixing chamber includes at least three sections, one section being defined as a base section, another section being defined as a head section, all other sections being defined as intermediate sections.

6. The head of claim 2 including at least one additional nozzle, the nozzles having differently sized discharge bores, and third coupling means for detachably securing any one of the nozzles to the chamber discharge port.

* * * * *